Nov. 29, 1966     E. TAUER     3,287,901
CLOSED CYCLE POWER GENERATING APPARATUS
Filed Nov. 22, 1963
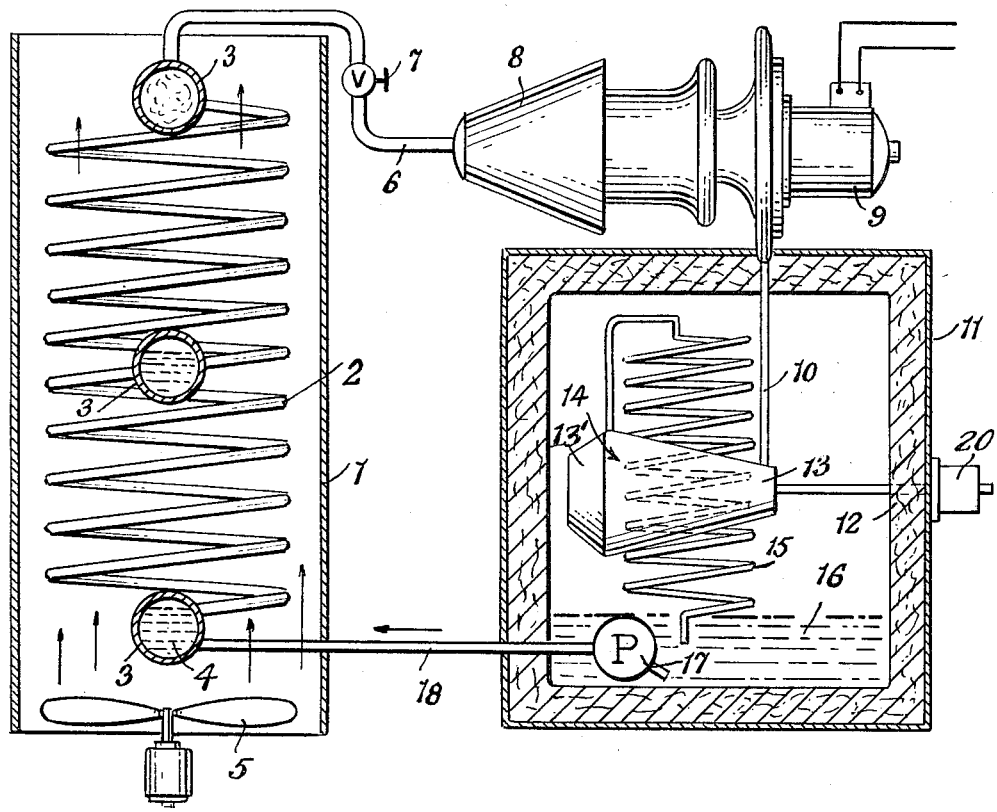
EDWARD TAUER
INVENTOR.
BY *[signature]*
*Attorney*

3,287,901
CLOSED CYCLE POWER GENERATING
APPARATUS
Edward Tauer, New York, N.Y., assignor to Atmospheric Energy, Ltd., New York, N.Y., a corporation of Delaware
Filed Nov. 22, 1963, Ser. No. 325,531
6 Claims. (Cl. 60—36)

This invention relates generally to a closed-cycle heat-utilizing, power-generating apparatus, and more particularly to one in which low boiling point liquid media such as liquid carbon dioxide is converted into a gas by means of heat; the gas so developed and by expansion being adapted to generate power.

It is one of the general objects of the invention to provide an apparatus and method by which power can be inexpensively generated as by the utilization of solar or stored-up solar energy as a fuel source.

A more specific object of the invention is to provide a simple and effective means for the generation of power, employing heat and any low boiling point liquid media capable of being converted as by an evaporator into a gas under pressure, and to provide means by which a re-conversion of the gas back into liquid can be had by cooling and pressure with the liquid then restored to the evaporator to be again converted into gas and begin its cycle.

More particularly the invention contemplates the employment of an evaporator through which the liquid such as carbon dioxide ($CO_2$) or other low boiling point liquid media is passed while being subjected to a heat source as ambient or heated air or water having sufficient heat content to convert said liquid into gas under pressure, the gas so developed being forced into a turbine that is coupled to a generator or other power developing means. Means are provided by which the gas, after acting on the turbine, is caused to flow through and internally of a cooling chamber insulated against infiltration of heat by means of heat barriers including maintenance of a partial vacuum approaching perfect value as a heat barrier element, the gas then entering under further expansion into the intake of a compression turbine within the chamber and discharging therefrom at a higher temperature and pressure than the chamber internal ambient. The gas then enters a heat exchanger or condenser in the chamber giving up its heat to the ambient and becomes reduced to liquid state for deposition within the chamber. A pump located in the chamber moves the media in liquid or hydrostatic condition back into the higher pressures of the evaporator to be again converted into a gas by the heat effective on it.

These objects and other ends and advantages of the invention will hereinafter be set forth in the progress of the specification and as pointed out in the claims.

In the accompanying drawing forming a part hereof, the view shown illustrates diagrammatically an apparatus constructed in accordance with the invention.

Referring to the drawing, 1 indicates diagrammatically any vessel adapted to serve as an evaporator or boiler and as shown contains a coil 2 provided with spaced expansion chambers shown at 3. Contained in the evaporator coil is any suitable low boiling point liquid media including liquid carbon dioxide ($CO_2$) indicated at 4.

A fluid stream of air or water with heat content or of other heat containing resource is adapted to flow naturally or by mechanical means as by fan or blower 5 past the coil 2 to change the low boiling point liquid media from liquid to gaseous state. The relatively higher temperature of the flow to the boiling point of the media causes the transition of the liquid to a gaseous state and to higher pressures by restriction of the gas to the volumetric condition of coil 2.

The gas thus created and under pressure as above stated, passes from the evaporator through the outlet pipe 6 containing a valve 7, and the gas is released against the blades of a turbine 8 thereby causing the rotation of the rotor of the turbine. The rotor of the turbine is coupled as illustratively shown to an electric generator 9, thereby generating electricity.

The exhausted gas passes from turbine 8 by way of the outlet pipe 10 into the interior of a cooling chamber 11 under heat barrier conditions to prevent heat infiltration. As illustrative, the chamber walls may be of any suitable construction and include spun glass or other such material and also may be under partial vacuum approaching perfect value. Such a chamber is an important feature of the invention in that its function primarily is to prevent heat transmission to the maximum and thereby be effective to cool the gas for transition back to liquid state.

Within the chamber 11, the pipe 10 connects to the inlet 13 of an expansion turbine 14, the outlet 13' of which lowers the pressure and temperature of the gas below the chamber internal ambient. Outlet 13' connects to a condenser coil 15 toward the end of which the gas becomes liquefied. Turbine 14 effectuates a lowering of the pressure and temperature of the gas passing therein from outlet pipe 10.

The carbon dioxide or other low boiling point media used becomes liquefied through its cooling in the chamber and the removal of some of its heat by the kinetic energy expended. A liquid feed pump 17, located in the chamber 11, returns the low boiling point liquid media 16 hydrostatically to the evaporator 2 by way of the return pipe 18, thus completing the cycle.

The device as disclosed in the present invention is essentially a power generator heat operated and using as its source of energy a flow having heat content such as ambient air, water or other source and which acts to convert the liquid carbon dioxide or other low boiling point media from a liquid to a gas propellant for the turbine 8 which as shown actuates an electrical generator. The power developed by the turbine 14 may, if desired, be utilized to operate a supplemental electrical generator as indicated at 20.

A feature of the present apparatus and method resides in the possibility of constructing the same from readily available parts, thus making the construction relatively inexpensive.

The heat required for the conversion of the carbon dioxide or other low boiling point media thus may be derived from the sun or from sun-stored energy sources, or from any other origin.

Having thus described an illustrative embodiment of the invention, it is understood that minor changes in structures, parts thereof, method and method steps may be resorted to without departing from the spirit of the invention and the scope of the appended claims.

I claim:
1. An apparatus for generating power comprising a closed fluid system, said closed fluid system including an evaporator, said evaporator being in the form of a coil provided with a plurality of enlarged expansion chambers, a tubular housing surrounding said coil, means for directing a heat-containing media into and through said housing whereby a fluid media in liquid form in said coil is transformed into a gaseous media, conduit means for conducting said gaseous media to a first turbine, said conduit means including valve means for controllably regulating the flow of the gaseous media from the evaporator to said first turbine, said first turbine having a rotor which is rotated under the effect of the gaseous media, means coupled to the rotor of said turbine and actuated thereby to generate power, an insulated cooling chamber, a second turbine in said cooling chamber, a conduit for conducting the gaseous media from said first turbine through said cooling chamber to said second turbine, said second turbine being effective to lower the temperature and pressure of said gaseous media, conduit means coupling said second turbine to a condenser coil within said cooling chamber whereby said gaseous media is transformed to a liquid state, said cooling chamber being liquid tight and serving to collect the liquid media therein, a pump in said chamber, and a conduit connecting said pump to the coil of said evaporator whereby the liquid media is conducted to said evaporator for subsequent continuous repetitive transfer of the fluid media through said system.

2. An apparatus for generating power comprising a closed fluid system, said closed fluid system including an evaporator, said evaporator being in the form of a coil provided with a plurality of enlarged expansion chambers, a tubular housing surrounding said coil, means for directing a heat-containing media into and through said housing whereby a fluid media in liquid form in said coil is transformed into a gaseous media, conduit means for conducting said gaseous media to a first turbine, said conduit means including valve means for controllably regulating the flow of the gaseous media from the evaporator to said first turbine, said first turbine having a rotor which is rotated under the effect of the gaseous media, means coupled to the rotor of said turbine and actuated thereby to generate power, an insulated cooling chamber, said cooling chamber being under a partial vacuum, a second turbine in said cooling chamber, a conduit for conducting the gaseous media from said first turbine through said cooling chamber to said second turbine, said second turbine being effective to lower the temperature and pressure of said gaseous media, conduit means coupling said second turbine to a condenser coil within said cooling chamber whereby said gaseous media is transformed to a liquid state, said cooling chamber being liquid tight and serving to collect the liquid media therein, a pump in said chamber, and a conduit connecting said pump to the coil of said evaporator whereby the liquid media is conducted to said evaporator for subsequent continuous repetitive transfer of the fluid media through said system.

3. An apparatus for generating power comprising a closed fluid system, said closed fluid system including an evaporator, said evaporator being in the form of a coil provided with a plurality of enlarged expansion chambers, a tubular housing surrounding said coil, means for directing a heat-containing media into and through said housing whereby a fluid media in liquid form in said coil is transformed into a gaseous media, conduit means for conducting said gaseous media to a first turbine, said first turbine having a rotor which is rotated under the effect of the gaseous media, means coupled to the rotor of said turbine and actuated thereby to generate power, an insulated cooling chamber, a second turbine in said cooling chamber, a conduit for conducting the gaseous media from said first turbine through said cooling chamber to said second turbine, said second turbine being effective to lower the temperature and pressure of said gaseous media, conduit means coupling said second turbine to a condenser coil within said cooling chamber whereby said gaseous media is transformed to a liquid state, said cooling chamber being liquid tight and serving to collect the liquid media therein, a pump in said chamber, and a conduit connecting said pump to the coil of said evaporator whereby the liquid media is conducted to said evaporator for subsequent continuous repetitive transfer of the fluid media through said system.

4. An appartus for generating power comprising a closed fluid system, said closed fluid system including an evaporator, said evaporator being in the form of a coil provided with a plurality of enlarged expansion chambers, a tubular housing surrounding said coil, means for directing a heat-containing media into and through said housing whereby a fluid media in liquid form in said coil is transformed into a gaseous media, conduit means for conducting said gaseous media to a first turbine, said first turbine having a rotor which is rotated under the effect of the gaseous media, means coupled to the rotor of said turbine and actuated thereby to generate power, an insulated cooling chamber, said cooling chamber being under a partial vacuum, a second turbine in said cooling chamber, a conduit for conducting the gaseous media from said first turbine through said cooling chamber to said second turbine, said second turbine being effective to lower the temperature and pressure of said gaseous media, conduit means coupling said second turbine to a condenser coil within said cooling chamber whereby said gaseous media is transformed to a liquid state, said cooling chamber being liquid tight and serving to collect the liquid media therein, a pump in said chamber, and a conduit connecting said pump to the coil of said evaporator whereby the liquid media is conducted to said evaporator for subsequent continuous repetitive transfer of the fluid media through said system.

5. An apparatus for generating power comprising a closed fluid system, said closed fluid system including an evaporator, said evaporator being in the form of a coil a housing surrounding said coil, means for directing a heat-containing media into said housing against said coil whereby a fluid media in liquid form in said coil is transformed into a gaseous media, conduit means for conducting said gaseous media to a first turbine, means coupled to said turbine and actuated thereby to generate power, an insulated cooling chamber, said cooling chamber being under a partial vacuum, a second turbine in said cooling chamber, a conduit for conducting the gaseous media from the first turbine through said cooling chamber to said second turbine, said second turbine being effective to lower the temperature and pressure of said gaseous media, a condenser coil coupled to said second turbine, said condenser coil being located within said cooling chamber whereby said gaseous media is transformed to a liquid state, said cooling chamber being liquid tight and serving to collect the liquid media therein, a pump, and means connecting said pump between said cooling chamber and said evaporator for subsequent continuous repetitive transfer of the fluid media through said system.

6. An apparatus for generating power comprising a closed fluid system, said closed fluid system including an evaporator, said evaporator being in the form of a coil, means for directing a heat-containing media against said coil whereby a fluid media in liquid form in said coil is transformed into a gaseous media, conduit means for conducting said gaseous media to a first turbine, means coupled to said turbine and actuated thereby to generate power, an insulated cooling chamber, said cooling chamber being under a partial vacuum, a second turbine in said cooling chamber, a conduit for conducting the gaseous media from the first turbine through said cooling chamber to said second turbine, said second turbine being effective to lower the temperature and pressure of said gaseous media, a condenser coil coupled to said second turbine, said condenser coil being located within said cooling chamber whereby said gaseous media is transformed to a liquid state, said cooling chamber being liquid tight and serving to collect the liquid media therein, a pump, and means connecting said pump between said cooling chamber and said evaporator for subsequent continuous repetitive transfer of the fluid media through said system.

(References on following page)

References Cited by the Examiner

UNITED STATES PATENTS

| | | | |
|---|---|---|---|
| 1,519,353 | 12/1924 | Bowen et al. | 60—36 X |
| 1,895,220 | 1/1933 | Grebe | 60—36 |
| 1,979,128 | 10/1934 | Watson. | |
| 3,003,321 | 10/1961 | Warth | 60—95 X |
| 3,124,696 | 3/1964 | Tucker | 60—36 X |
| 3,162,580 | 12/1964 | Black et al. | 60—36 X |

FOREIGN PATENTS

| | | |
|---|---|---|
| 377,729 | 7/1932 | Great Britain. |
| 785,035 | 10/1957 | Great Britain. |

EDGAR W. GEOGHEGAN, *Primary Examiner.*

JULIUS E. WEST, SAMUEL LEVINE, *Examiners.*

A. S. ROSEN, *Assistant Examiner.*